United States Patent [19]

Fogal, Sr. et al.

[11] Patent Number: 5,472,023
[45] Date of Patent: Dec. 5, 1995

[54] METHOD OF AND APPARATUS FOR INTRODUCING POLVERULENT MATERIAL INTO A TIRE

[75] Inventors: Robert D. Fogal, Sr., Chambersburg, Pa.; Raymond Buckles, St. Louis; Warren Schuessler, Jr., Florissant, both of Mo.

[73] Assignee: International Marketing, Inc., Chambersburg, Pa.

[21] Appl. No.: 229,536

[22] Filed: Apr. 19, 1994

Related U.S. Application Data

[63] Continuation-in-part of Ser. No. 40,289, Mar. 30, 1993, Pat. No. 5,386,857.

[51] Int. Cl.$^6$ .................................................. B60C 19/00
[52] U.S. Cl. .................................. 141/9; 141/5; 141/38; 141/67; 141/100; 406/38; 406/146; 156/75; 152/154.1
[58] Field of Search .................................. 141/1, 4, 5, 9, 141/38, 67, 100, 102, 105; 406/38, 108, 122, 128–130, 137, 139, 146; 156/75, 115; 152/153, 154.1, 155, 157, 310–322, 415, 450, 502–504, 521; 301/5.22

[56] References Cited

U.S. PATENT DOCUMENTS

| | | | |
|---|---|---|---|
| 1,467,488 | 9/1923 | Muste | 406/128 |
| 2,792,262 | 5/1957 | Hathorn | 406/146 |
| 2,817,310 | 12/1957 | Ponzini | 406/146 |
| 3,065,774 | 11/1962 | Grimes | 141/38 |
| 3,200,858 | 8/1965 | Kampert | 141/38 |
| 3,450,170 | 6/1969 | Andersen | 141/5 |
| 3,515,181 | 6/1970 | Sperberg | 141/38 |
| 4,027,712 | 6/1977 | Verdier | 152/311 |
| 4,665,956 | 5/1987 | Freeman | 141/231 |
| 4,678,377 | 7/1987 | Bouchard | 406/139 |
| 4,917,544 | 4/1990 | Crahan et al. | 406/146 |
| 5,073,217 | 12/1991 | Fogal | 156/75 |

FOREIGN PATENT DOCUMENTS

| | | | |
|---|---|---|---|
| 874283 | 6/1971 | Canada | 222/31 |
| 0808809 | 7/1951 | Germany | 406/139 |

*Primary Examiner*—J. Casimer Jacyna
*Attorney, Agent, or Firm*—Oldham & Oldham Co.

[57] ABSTRACT

Method of and apparatus for introducing pulverulent material into a tire for the purpose of balancing a tire and an associated wheel assembly. A quantity of polymeric pulverulent material sufficient to balance a tire and an associated wheel assembly is charged to a cylindrical chamber and confined therein. Pressurized air is passed through the chamber in such manner as to form cyclonic air currents in the chamber. The cyclonic air currents can be obtained by configuring the air inlet and the air outlet for the chamber so that their respective axes are not aligned. A mixture of air and pulverulent material is withdrawn from the chamber and passed to a tire which is being balanced. An apparatus for practicing this method comprises a container having a transparent cylindrical side wall and a pair of end caps which together enclose a chamber for pulverulent material; an in-line filter, a pressure regulator and a first on-off valve which together form an air supply flow path for supplying air under pressure to the chamber, and a second on-off valve and a flexible hose having a quick disconnect coupling at its discharge end for conveying a mixture of pressurized air and pulverulent material from the chamber to a tire.

24 Claims, 6 Drawing Sheets

5,472,023

METHOD OF AND APPARATUS FOR INTRODUCING POLVERULENT MATERIAL INTO A TIRE

CROSS REFERENCE TO RELATED APPLICATION

This application is a continuation-in-part of United States application of Robert D. Fogal, Ser. No. 08/040,289, filed Mar. 30, 1993, now U.S. Pat. No. 5,386,857.

BACKGROUND OF THE INVENTION

The invention is directed to a novel method of and apparatus for introducing pulverulent material into tires, specifically radial tires of wheel assemblies of passenger and truck vehicles and aircraft. The method and apparatus are specifically directed to utilizing pulverulent polymeric synthetic plastic material and introducing the same into a tire through an associated tire valve to effect dynamic balancing of the associated wheel assembly and equalization of radial and lateral load force variations as the wheel assembly is subject to impact forces during rotation thereof along a surface, such as a road, airfield or the like.

The specifics of the method of balancing a wheel assembly and equalizing radial and lateral load force variations in accordance with injection of pulverulent polymeric synthetic plastic material into a tire are fully disclosed in U.S. Pat. No. 5,073,217 in the name of Robert D. Fogal issued on Dec. 17, 1991. The specifics of the pulverulent material, as set forth in the latter patent and the screen size ranges, pulverulent material weight ranges and the weight ranges for a specific range of tires, as also set forth in the latter-identified patent, are all incorporated herein by reference.

The term, "pulverulent polymeric material" as used herein denotes a solid material in pulverulent or particulate form which comprises a polymer (which may be either a homopolymer or a copolymer) and which may comprise other constituents, i.e., fillers and additives. The preferred pulverulent polymeric material, as set forth in U.S. Pat. No. 5,073,217, comprises a major portion (70% by weight) of a polymeric material, specifically, a polymerized urea formaldehyde thermoset resin having a particle size range and other physical characteristics as set forth in U.S. Pat. No. 5,073,217, and minor portions of constituents, i.e, 25% by weight cellulosic filler and 2% pigments and additives. This material has a specific gravity of 1.47–1.52 and a bulk density of 58–60 pounds per cubic foot (0.93–0.96 grams per cubic centimeter).

SUMMARY OF THE INVENTION

In keeping with the present method, pulverulent material is introduced into a tire through a tire valve stem when the tire is inflated or partially deflated by (a) confining a predetermined amount of the pulverulent material, (b) subjecting the confined pulverulent material to pressurized cyclonic air currents, and (c) introducing the pulverulent material into a tire through an associated tire valve stem under the influence of the pressurized cyclonic air currents.

The method also includes filtering any moisture from the pulverulent material prior to the performance of confining step (a), specifically performing step (a) by establishing a generally cylindrically shaped fixed volume of confinement, and creating the cyclonic air currents of step (c) by introducing and removing pressurized air into and out of the cylindrically shaped confinement volume at generally axially spaced and radially non-aligned points.

The apparatus for accomplishing the method just described includes a generally cylindrical container which defines a chamber having an inlet and an outlet for establishing a flow path for pressurized air having upstream and downstream flow path portions with said chamber located therebetween; an in-line filter, a pressure regulator and a first manually operable on-off valve in the upstream flow path portion; and in the downstream flow path portion, a hose assembly equipped with a second on-off valve adjacent the chamber outlet and a quick disconnect coupling for securing the hose assembly to a valve stem of an associated tire. The inlet and the outlet of the cylindrical chamber are axially remote and radially non-aligned from each other to produce pressurized cyclonic air currents in the chamber under the influence of which pulverulent material therein is introduced into the tire through the tire valve stem upon the opening of the hose assembly valve. The volume of pulverulent material which is confined depends on the size of the tire and is sufficient to effect dynamic balancing of the tire and an associated wheel assembly but insufficient to fill a tire. The volume of the chamber is sufficient to contain the required volume of pulverulent material.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

Figure 1:
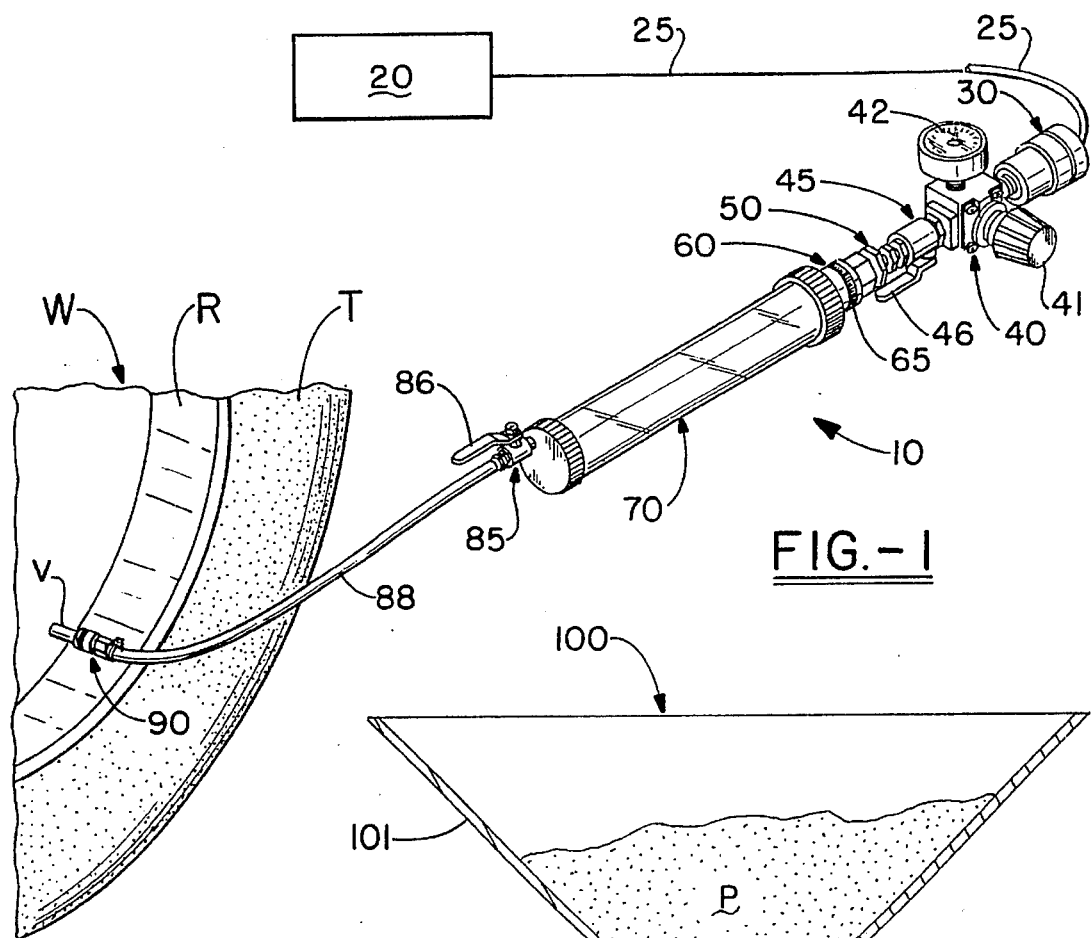
FIG. 1 is a fragmentary perspective view of an apparatus for introducing pulverulent material into a tire according to a first embodiment of this invention, and illustrates a source of air pressure, an in-line moisture filter, a pressure regulator, an on-off valve, a cylindrical container which defines a chamber for pulverulent material, another on-off valve, a flexible hose and a quick disconnect coupling secured to a valve stem of an associated tire.

A novel apparatus according to a first embodiment of this invention for introducing pulverulent material, such as the pulverulent polymeric synthetic plastic material set forth in U.S. Pat. No. 5,073,217 is illustrated in FIGS. 1 through 3 of the drawings, and is generally designated by the reference numeral 10.

The apparatus 10 is shown in FIG. 1 associated with a tire/wheel assembly W of an automobile, bus, truck, aircraft or the like which includes a tire T which is preferably a radial tire, a rim R, and a valve V conventionally secured to the rim R and being in conventional fluid communication with the tire T. The valve V includes a conventional valve core (not shown) which is preferably, though not necessarily, removed during the introduction of the pulverulent material into the tire T, as will be described more fully hereinafter. As is conventional, the valve V and associated valve stem constitute the only air inlet/outlet for the T.

The apparatus 10 is adapted to be connected to a source 20 of pressurized air, such as a conventional air compressor. The apparatus 10 comprises a conventional flexible line or hose 25, in-line filter means 30 for entrapping moisture and preventing moisture from flowing there-beyond, regulator means 40 for variably selectively adjustably regulating the air pressure, on-off valve means 45 for respectively permitting/preventing pressurized air flow, air inlet nipple assembly means 50 for introducing pressurized air into a container 70 which defines and encloses a cylindrical chamber 71 and creating therein cyclonic pressurized air currents, quick disconnect coupling means 60 for connecting/disconnecting the air inlet nipple assembly means 50 to the container 70, and another on-off valve means 85 for controlling the discharge of admixed pulverulent material/air into a flexible line or hose 88 which includes a conventional valve stem quick disconnect coupling 90.

Figure 2:
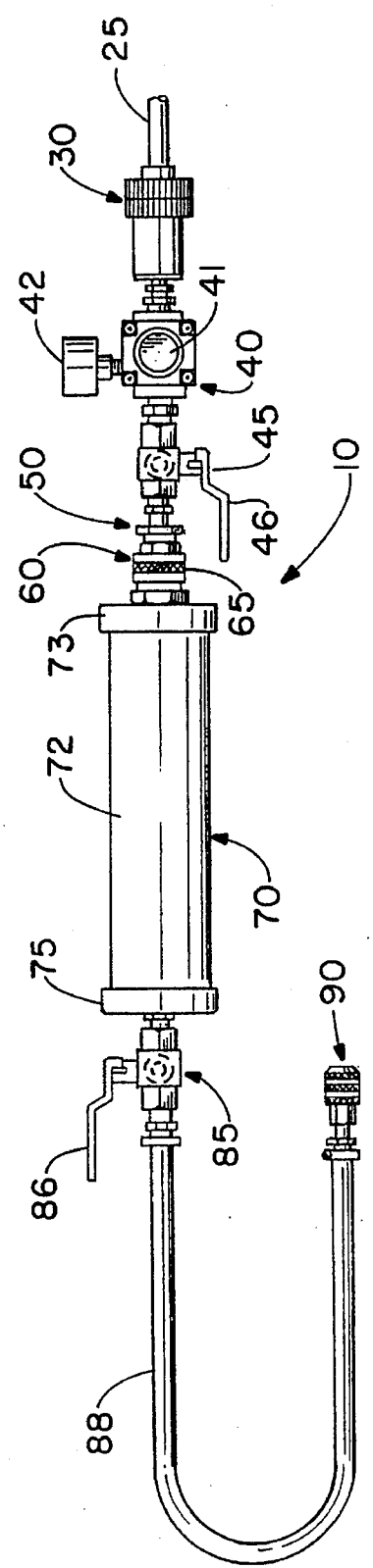
FIG. 2 is an enlarged side elevational view of a portion of the apparatus of FIG. 1.
Figure 3:
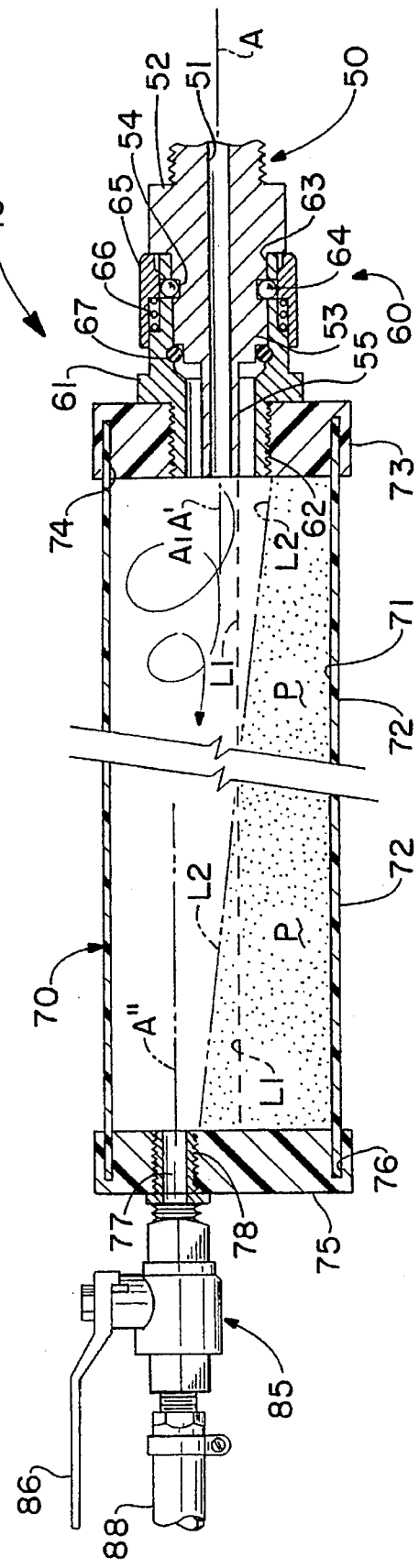
FIG. 3 is an enlarged fragmentary axial cross-sectional view through a portion of the cylindrical chamber of FIGS. 1 and 2, and illustrates an axially spaced and radially offset inlet and outlet which create pressurized cyclonic air currents within the chamber for forcefully driving the pulverulent material through the outlet of the chamber and subsequently into the associated tire.

In FIGS. 1 through 3 the apparatus 10 is illustrated in its operative condition, namely, preparatory to delivery off pulverulent material P from the chamber 71 into the interior (unnumbered) of the tire T. However, prior thereto the chamber 71 must be charged/filled with the pulverulent material P, and the latter is accomplished through funnel assembly means 100 shown in FIG. 4 containing pulverulent material P which is illustrated being gravity fed in the direction of the unnumbered headed arrows associated therewith into an interior cylindrical chamber or volume 71 of the chamber means 70.

Figure 5:
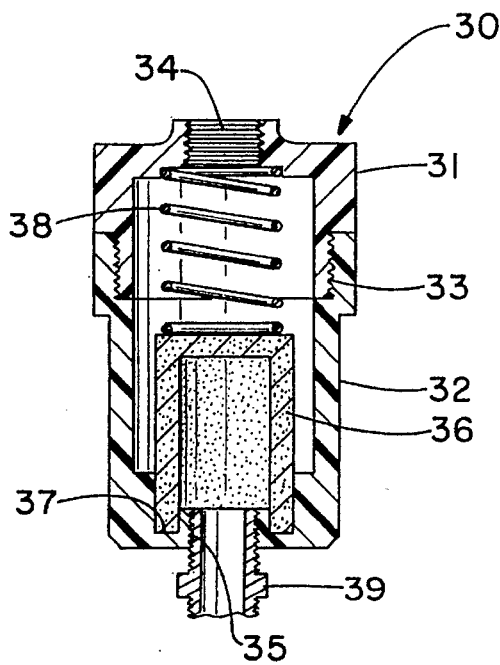
FIG. 5 is a fragmentary axial cross-sectional view through the in-line moisture filter of FIGS. 1 and 2, and illustrates the details of the construction thereof.
Figure 6:
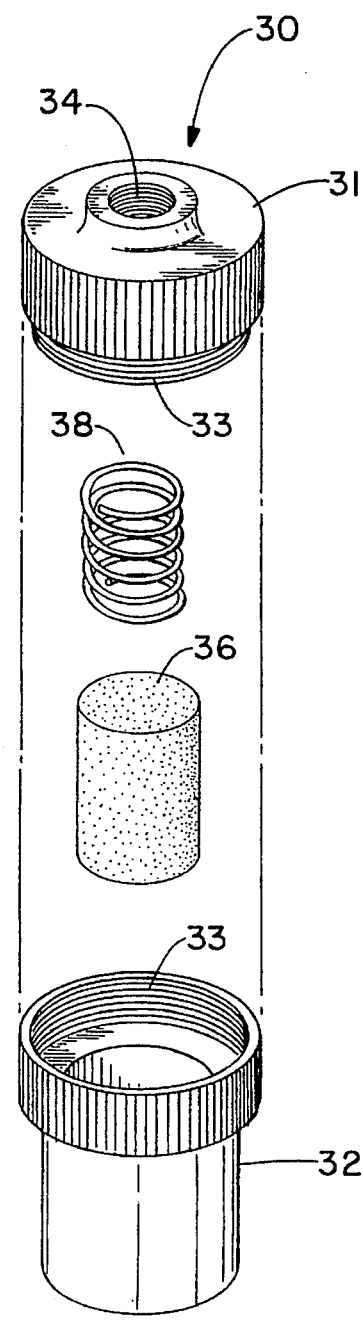
FIG. 6 is an enlarged exploded view of the in-line moisture filter of FIG. 5, and illustrates the manner in which a filter element/cartridge thereof can be removed and/or replaced.

The in-line filter means 30 for entrapping moisture of preventing moisture from flowing downstream toward and into the regulator means 40 and therebeyond is best illustrated in FIGS. 5 and 6 of the drawings and includes two generally cylindrical bodies 31, 32 which can be threaded and unthreaded by complementary threads 33. The cylindrical body 31 includes internal threads 34 to which a fitting (not shown) of the line or hose 25 is connected while the generally cylindrical body 32 likewise includes threads 35 to which a fitting 39, such as a hex nipple, is threaded. A generally cylindrical cup-shaped filter element/cartridge 36 has a lower terminal edge (unnumbered) seated in an upwardly opening annular groove 37. A compression spring 38 bottoms against an end (unnumbered) of the filter or filter element 36 and holds the terminal edge thereof within the groove 37 when the cylindrical bodies 31, 32 are fastened together by the complementary threads 33. The generally cylindrical bodies 31, 32 can be unthreaded to gain access to the filter 36, remove the filter, filter element or filter cartridge 36, and replace the same by a new cartridge, as in-use conditions dictate. The filter element 36 does not absorb moisture; it blocks moisture/condensate/water as the molecules of the filter element 36 expand as the filter element 36 becomes contaminated with moisture. As the molecules of the filter element 36 expand, they thus block the passage of air. If the filter element 36 becomes completely saturated, it will expand to the point of completely stopping all movement of air and/or moisture therethrough. Thus, the filter means 30 is a fail-safe check valve against moisture contamination form the compressed air source 20 via the line 25. When the filter element 36 becomes completely saturated, the cylindrical bodies 31, 32 may be unthreaded by the complementary threads 33, a new filter element may replace the filter element 36, and operation can then continue.

The filter element 36 may be similar to the filter elements shown and described in U.S. Pat. No. 5,112,167, especially to the in-line filter element shown in FIG. 3 thereof.

The fitting 39 is threaded into an inlet (unnumbered) of the regulator means 40 (FIG. 2), which is preferably any one of several general purpose compressed air regulators manufactured by Norgren of 5400 South Delaware Street, Littleton, Colo. Compressed air regulators can be selected from various Norgren models for operating between pressure ranges of 250–400 psi (bar) and temperature ranges from 0° to 175° F., such as Models RO5, R44, R46, R08, R12, R17, R22, R7 and 11-002. A handle 41 of the air regulator 40 is rotated appropriately to establish the outlet air pressure which is indicated upon a dial scale 42. The knob or handle 41 is pushed into lock a desired pressure setting and pulled out to unlock the pressure setting. In accordance with this invention the preferable maximum air pressure exiting the regulator 40 is 125 psi.

The on-off valve means 45 is suitably conventionally threaded to an outlet (not shown) of the regulator 41 and is in turn threaded conventionally to the air inlet nipple assembly means 50. The on-off valve 45 is a conventional ball valve and includes a handle 46 which controls the flow of air through the valve 45.

Figure 1A:
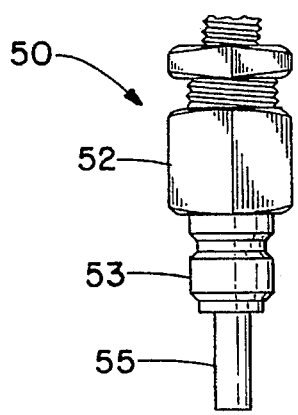
FIG. 1A is an enlarged elevational view of an air inlet nipple assembly for introducing pressurized air into a container for pulverulent material.

The air inlet nipple assembly means 50 is shown in an elevational view in FIG. 1A and in longitudinal section in FIG. 3. The air inlet nipple assembly means 50 includes an air inlet, bore or passage 51 having an axis A (FIG. 3) which is coincident with an axis A' of the cylindrical container 70 and the cylindrical chamber 71 thereof. The air inlet or passage 51 is formed through a body 52 of the air inlet nozzle assembly means 50 including a major diameter portion 53 thereof which includes an outwardly opening locking groove and a minor diameter portion or reduced stem 55. The major diameter portion 53 defines the male portion of a quick disconnect coupling means 60 which is of a conventional construction and includes a tubular body 61 having an exterior threaded stem 62 and a female coupler 63 carrying locking balls 64 which are held locked in the groove 54 by an axial movable locking collar 65 normally biased to the locked position (FIG. 3) by a spring 66. In the locked condition an O-ring 67 provides a hermetic seal.

When the collar 65 is moved downwardly, as viewed in FIG. 3, against the compression of the spring 66, the balls 64 are released from the groove 54 to allow the air inlet nipple assembly means 50 to be disconnected from the container 70.

The container 70 is preferably formed of three pieces of transparent polycarbonate (Lexan), namely, a cylindrical wall or housing 72 defining the cylindrical chamber or volume 71, an end cap 73 having an annular groove 74 and an end cap 75 having an annular groove 76. The groove 74, 76 receive therein terminal edges (unnumbered) of the wall 72 and are preferably glued, ultrasonically bonded or otherwise permanently secured to each other. Outlet means or discharge means 77 of the container 70 are defined by a fitting 78 threaded into a threaded bore (unnumbered) of the end cap 75. The outlet means or outlet 77 has an axis A" which is radially offset from the axis A, A', as is readily apparent in FIG. 3 of the drawings. Because of the radial offset between the axis A of the air inlet 51 and the axis A" of the outlet means or outlet 77, the pressurized air exiting the air inlet 51 creates cyclonic air currents within the chamber 71 and thereby creates a uniform or homogeneous admixture of the pulverulent material P with the air which assures the discharge thereof through the outlet 77 without plugging the latter or plugging the valve stem V as might otherwise occur if the pulverulent material P agglomerates, a condition which would tend to occur if the axis A, A' and A" were coincident because the air exiting the air inlet 51 would be directed precisely toward the air outlet 77 and would tend to simply blow a mass of the pulverulent material P toward, into and in clogging relationship with the outlet 77. However, due to the radial offset of the axis A, A' relative to the axis A" such agglomeration/plugging is virtually precluded due to the cyclonic air/pulverulent material admixture current flow to, into and through the outlet 77.

The on-off valve means or valve 85 is also conventional and is threaded at one end to the fitting 78 and at an opposite end (unnumbered) to the flexible line or hose 88 with a handle 86 being utilized to open and/or close or regulate flow.

The valve stem quick disconnect means 90 is also conventional and serves to connect the hose 88 to the valve stem V when the valve core has preferably been removed therefrom.

Figure 4:
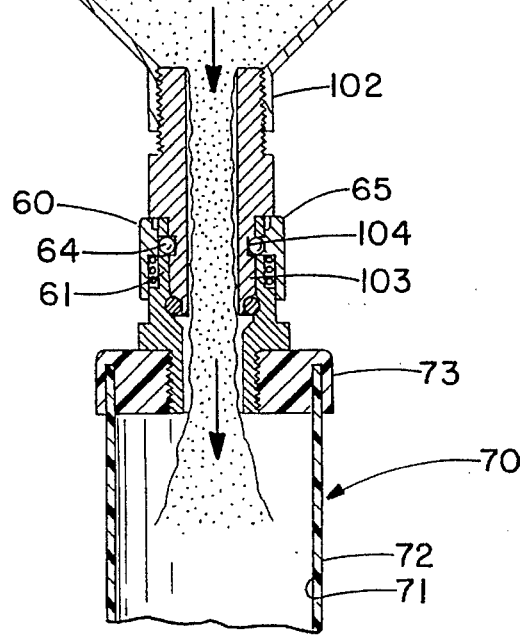
FIG. 4 is a fragmentary cross-sectional view of an inlet end of the chamber, and illustrates a funnel assembly having a quick disconnect fitting for charging the pulverulent material into the inlet opening of the cylindrical chamber.

Reference is made to FIG. 4 which illustrates the air inlet nipple assembly means 50 removed from the quick disconnect coupling means 60. Secured to the latter is the funnel assembly means 100 which includes a metallic funnel 101 which includes an internally threaded cylindrical portion 102 threaded upon an exterior threaded portion of a male coupler 103 having an outwardly opening peripheral groove 104. Before the tire T is charged with the pulverulent material P, the pulverulent material P must be first charged into the container 70, and this is done simply by gravity, as shown in FIG. 4. Obviously, if the air inlet nipple assembly means 50 is connected to the quick disconnect coupling means 60, the latter are disconnected, as shown in FIG. 4, the male coupler 103 is inserted into the tubular body 61 of the quick disconnect coupling means 60, the pulverulent material P is poured into the funnel 101, and eventually the container 70 is filled with an appropriate amount of the pulverulent material P. Thereafter, the collar 65 is moved downwardly, as viewed in FIG. 4, releasing the funnel assembly means 100 which is removed and followed by the recoupling of the air inlet nipple assembly 50 to the quick disconnect coupling means 60.

The amount of pulverulent material P which is introduced into the chamber 71 of the container 70 depends upon the particular size of the tire which is to be charged, and may, for example, range from 3 ounces (85 grams) to 24 ounces (680 grams). For example, for a tire size 215/85 (R16), three ounces of the pulverulent material P is sufficient per tire. A tire size of 205/60 (R17.3) requires 4 ounces of pulverulent material P per tire, whereas a 235/80 (R22.5) tire size requires 6 ounces of the pulverulent material P. At the larger spectrum of tire sizes, an 18 (R22.5) tire size requires 24 ounces of the pulverulent material P. Thus, the overall size of the chamber 71 of container 70 must be sufficient to adequately contain anywhere from 3 ounces to 24 ounces of the pulverulent material P, and it has been found that a chamber 71 of approximately 16 inches (40.6 centimeters) end-to-end of a 3 inch (7.62 cm) internal diameter will accommodate up to and beyond the maximum 24 ounces (680 grams) of pulverulent material and create and maintain the desired cyclonic pressurized air currents heretofore noted.

Once the pulverulent material P has been introduced into the chamber 71, both valve V or valves 45, 85 are closed. The valve core (not shown) of the valve stem V is removed and the air pressure of the tire T is bled down to approximately 40 psi for most large tires, particularly truck, bus and larger aircraft tires. The hose 88 is then connected via the valve stem quick disconnect coupling 90 to the valve stem V, and the air pressure regulator 40 is set by appropriately rotating the handle or knob 41 to adjust the air pressure so as not to exceed recommended tire inflation pressure and at no time exceed 125 psi. The air compressor 20 is energized, if not earlier energized, but at no time is the air compressor 20 energized while the valve 45 is open.

The container 70 is then held horizontal and shaken to make certain that the pulverulent material P is clear from both the air inlet 51 and the outlet 77. As might be appreciated from FIG. 4, the pulverulent material P falling into the chamber 71 will enter the outlet 77 during the filling operation, and though the pulverulent material P is extremely dry, freely flowable and powdery, an effort should be made to remove the same from any one or both of the air inlet 51 and the outlet 77 to prevent plugging/agglomeration in and anywhere downstream from the outlet 77. By holding the container 70 horizontally and shaking the same, preferably horizontally, both the air inlet 51 and the outlet 77 are freed of the pulverulent material P. In FIG. 3, there are two line L1, L2 which designate two different levels/attitudes of the pulverulent material P in the chamber 71 after the completion of the horizontal shaking operation just described. The level L1 of the pulverulent material P is essentially parallel to the horizontal when the container 70 is essentially horizontal. The level L2 is a variation of the level of the pulverulent material when the container 70 is perhaps not held perfectly level to the horizontal or is not shaken to essentially level the pulverulent material P with its surface generally horizontal. However, at both levels L1, L2 of the pulverulent material P and any other levels, it is important to note that both the inlet 51 and the outlet 77 are free of the pulverulent material P, but more importantly both the inlet 51 and the outlet 77 are above the levels L1, L2 or any other levels of the pulverulent material P.

While the container 70 is held in the horizontal position shown in FIG. 3 with any one of the levels L1, L2 . . . Ln being clearly visible in the chamber 71 through the transparent wall 72, the operator opens the valve 85 by appropriately moving the handle 81. Thereafter, the handle 46 is moved to open the valve 45, and as the air exits the air inlet 51, it impinges upon and admixes with the pulverulent material P which can be visually seen through the transparent wall 72. This admixture is extremely homogeneous and the latter is achieved through a swirling or cyclonic air current effect created by the radial offset of the inlet and outlet axes A, A", respectively. Thus, as pressurized cyclonic air currents are created in the chamber 71, as indicated by the unnumbered arrows therein, the admixed pulverulent material and pressurized air, hereinafter termed pressurized admixture, will be delivered through the hose 88, the quick disconnect coupling 90 and the valve stem V in the interior of the tire T. The operator slowly and methodically lowers the left end of the container 70, as viewed in FIG. 3, away from the horizontal (or alternatively lifts the right end thereof) which progressively feeds more and more of the pulverulent material P toward the air stream entering through the inlet 51 creating the pressurized admixture and delivering the pressurized admixture progressively into and through the outlet 77. Thus by tilting the container 70 from the horizontal position shown in FIG. 3 slowly counter-clockwise, so to speak, in this same figure, the pulverulent material P will be slowly and uniformly introduced form its upper surface levels L1, L2 . . . Ln into the air stream exiting the air inlet 51, and this coupled with the cyclonic/swirling air current heretofore noted assures that the pressurized admixture is homogenous/uniform and, therefore, will neither agglomerate in or plug the outlet 77 or the air flow path downstream therefrom resulting in the discharging of the precise amount of pulverulent material P required into the tire T. After totality of the pressurized admixture, including all of the pulverulent material P, has been discharged from the chamber means 70 into the tire T, the handle 46 of the on-off valve means 45 is moved to its closed position and with or without moving the handle 86 of the valve 85 to its closed position the disconnect coupling 90 is disconnected from the valve stem V. The valve core (not shown) is quickly replaced into the valve stem V, and the tire is re-aired to its recommended pressure with the valve stem V being recapped by a self-sealing tire valve stem cap.

If during the charging operation just described, the pulverulent material plugs at the valve stem V, the valve 45 is closed and the valve 80 remains open and the air pressure in the tire T forces or blows any "plugged" pulverulent material from the valve stem V. Obviously, both valves 45, 85 should be closed at any time if the operator senses too high of a pressure rise in the tire T. In addition, before the air inlet nipple assembly means 50 is removed to refill/recharge the chamber 70, as shown in FIG. 4, the air compressor 20 must be turned off and both valves 45, 85 must be opened to relieve any internal pressure in the overall apparatus 10. Generally, the charging operation just described can be completed by an operator in less than 60 seconds.

Figure 7:
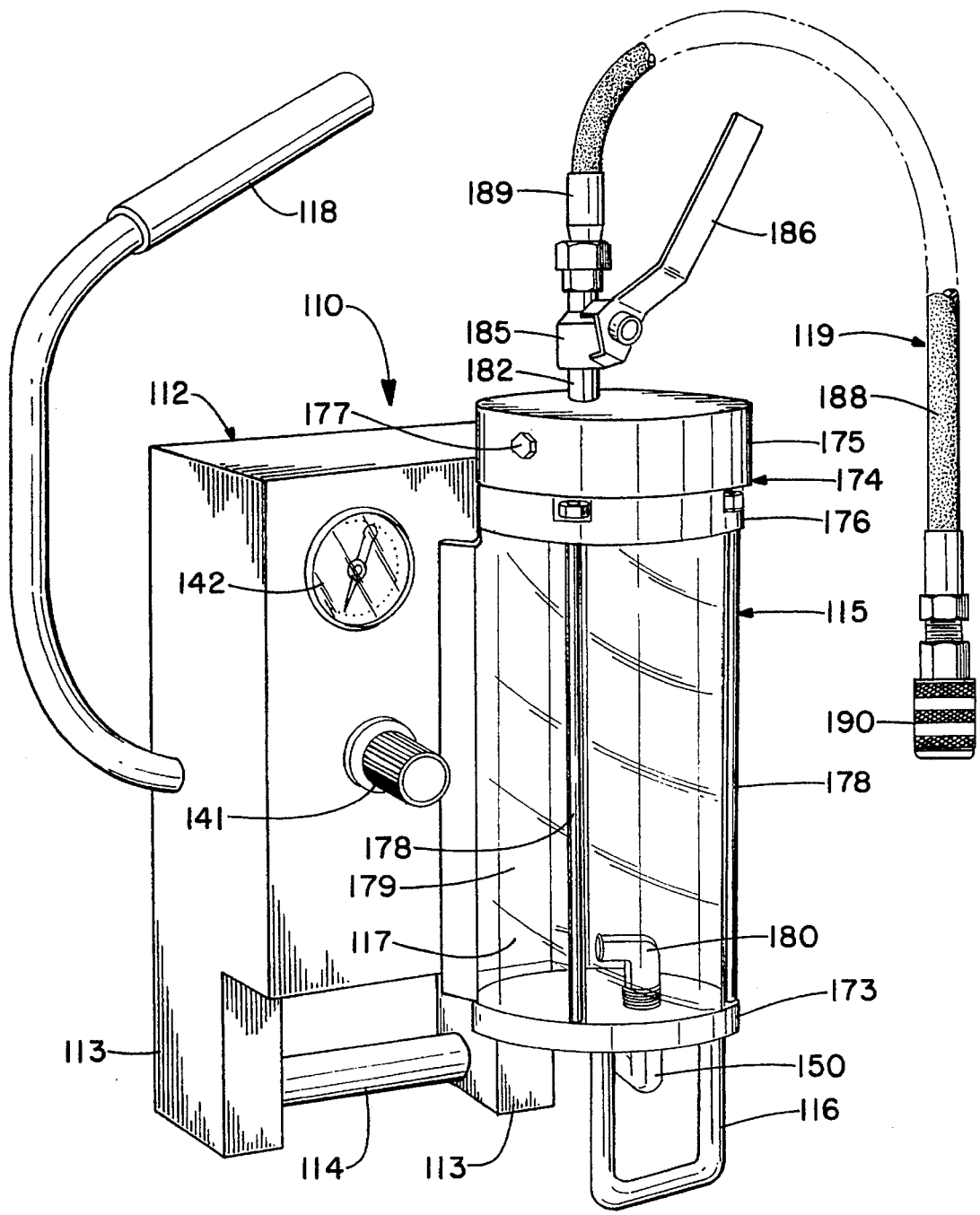
FIG. 7 is a perspective view, as seen from the front, of an apparatus for introducing pulverulent material into a tire according to a second embodiment of this invention.
Figure 8:
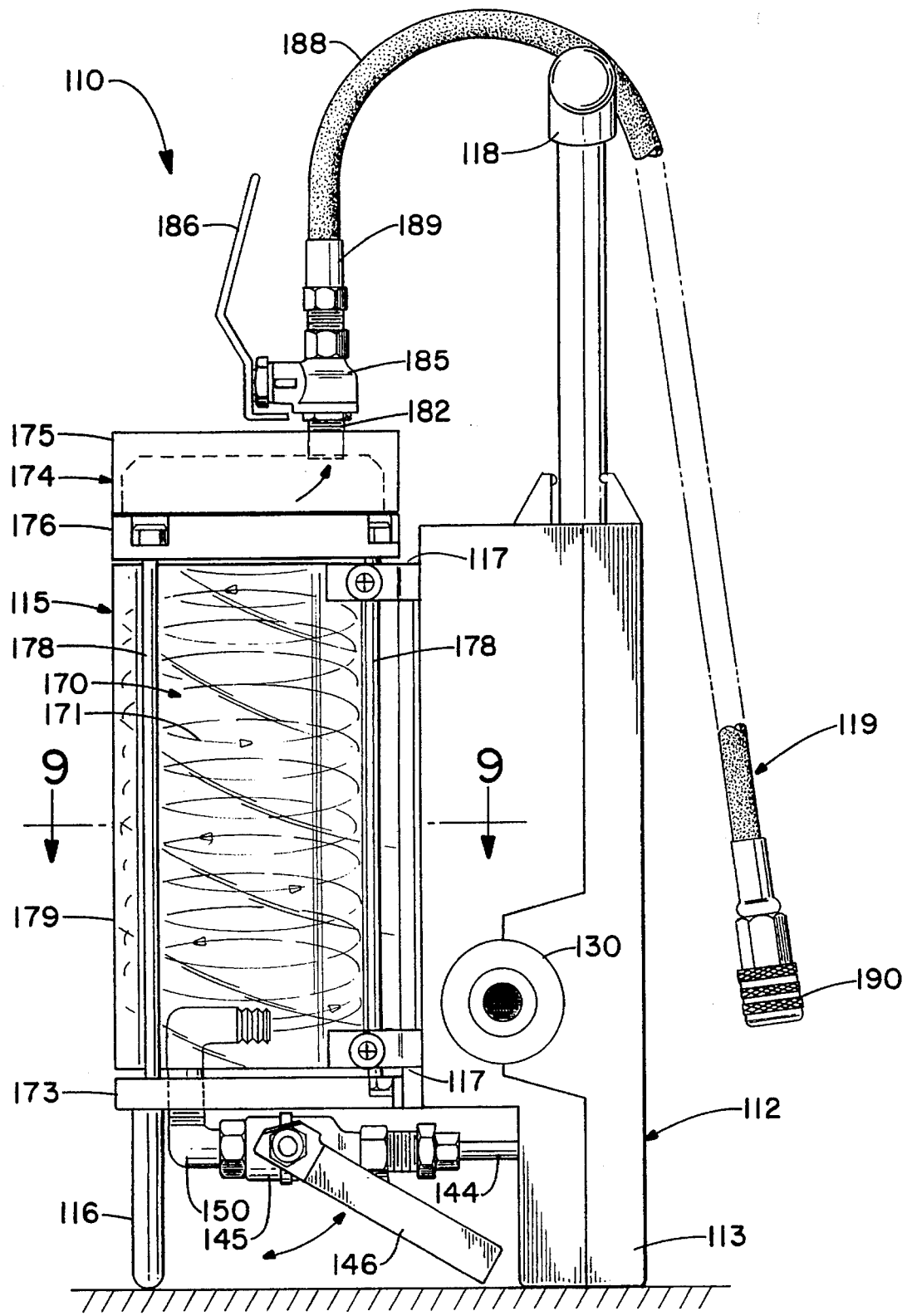
FIG. 8 is a rear elevational view of the apparatus shown in FIG. 7.
Figure 9:
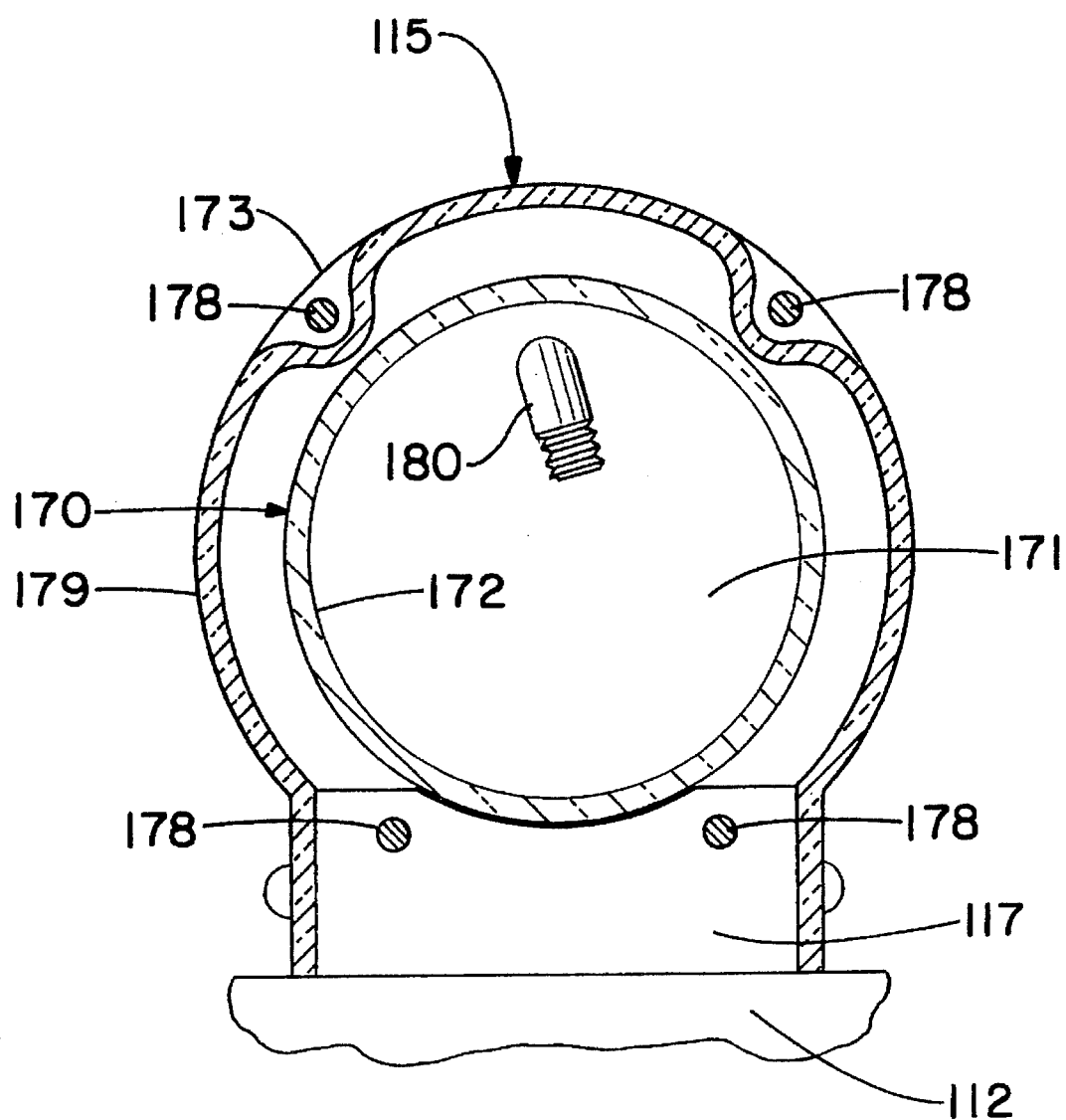
FIG. 9 is a cross sectional view, taken along line 9—9 of FIG. 8, of a container for pulverulent material according to this invention.

FIGS. 7–9 illustrate an apparatus 110 for introducing pulverulent material into a tire according to a second embodiment of this invention. This apparatus or applicator 110 is light in weight and portable. Apparatus 110 comprises an upright air supply chassis or housing 112 in the shape of a rectangular prism and having legs 113 and a stationary handle 114 at a lower end. Apparatus 110 further comprises an upright cylindrical container or tank assembly 115 for confining a predetermined volume of pulverulent polymeric material and forming an air/pulverulent material mixture. Cylindrical container assembly 115 has a U-shaped leg 116 depending from a lower end thereof. Chassis 112 and container assembly 115 are fixedly secured together by a pair of spaced mounting brackets 117 (FIG. 8) to form a unitary assembly. Legs 113 and 116 are provided for supporting the apparatus 110 in an upright position. A rotatable handle 118 attached to air supply housing 112, enables a user to carry the apparatus from place to place and to tilt the apparatus from its normal up right position. A flexible hose assembly 119 delivers a pressurized mixture of air and pulverulent material from cylindrical container assembly 115 to a tire.

Air supply housing 112 contains the pads or components necessary to provide a flow path for compressed air from a compressed air source to container 115. The compressed air source (e.g., 20, shown in FIG. 1) may be conventional, e.g., an air compressor. For safety reasons, the maximum air supply pressure from this source should not exceed 165 psi. Mounted in one side wall of housing 112 is an in-line filter 130 (FIG. 8) which includes an air intake for connection to a conventional pressurized air source such as an air compressor. Inside the housing are a pressure regulator (not shown) and means providing a flow path or passageway connecting the in-line filter means 130 and the pressure regulator in series so that all compressed air must flow through filter means 130. The filter means 130 may be similar or identical to filter means 30 shown in FIGS. 1, 2, and 5. The pressure regulator may be similar or identical to pressure regulator 40 shown in FIGS. 1 and 2.

Associated with the pressure regulator is a rotatable knob 141 for manually setting outlet air pressure and a pressure gauge 142 for indicating outlet pressure. Both are visible and accessible from a first or front surface of housing 112.

The preferable maximum air pressure exiting regulator 140 is 125 psi. The minimum outlet pressure should be sufficient to inflate a tire, e.g., at least about 25 psi, preferably at least about 40 psi.

Tubing 144 (shown in FIG. 8) extends from the outlet of pressure regulator (which is inside housing 112) to an inlet port of a first on-off valve 145. This valve 145 may be opened and closed by means of a manually operable handle 146. Valve 145 may be a ball valve. Valve 145 is open when handle 146 is horizontal (i.e., in-line with the direction of air flow through the valve) and closed when the handle is vertical (i.e., transverse to the direction of air flow through the valve). Valve 145 and handle 146 may be located outside housing 112 and below container 115 as shown in FIG. 8. Valve 145 controls the supply of compressed air to container assembly 115. A hollow elbow 150 (FIGS. 7 and 8) is connected (e.g., threadedly connected) to an outlet port of valve 145. Elbow 150 provides the inlet passageway to cylindrical container assembly 115.

A container assembly 115 comprises an upright cylindrical container 170 and a transparent safety shield 179. Container 170 in turn comprises a transparent vertical cylindrical wall 172, an end cap 173 at the lower or inlet ends, and a twist cap assembly 174 at the upper or outlet end. Container 170 has a cylindrical wall or housing 172 (FIG. 9) which is preferably formed of transparent polycarbonate (Lexan). This wall or housing 172 defines a cylindrical chamber 171 of fixed dimensions for containing pulverulent material. Container 170, chamber 171 and cylindrical wall 172 have a common vertical axis. Chamber 171 has an inlet end (the lower end) and an outlet end (the upper end).

Container 170 further comprises an end cap 173 at the lower or inlet end, and a twist lock filler cap assembly 174 at the upper or outlet end. End cap 173 and filler cap assembly 174 enclose the ends of chamber 171. End cap 173 and filler cap assembly are preferably metallic. This twist lock filler cap assembly 174 comprises a rotatable and removable filler cap 175, a ring, or bulkhead 176 which is fixedly secured to one end of cylinder 172, and a bottom 177 which controls a locking pin (not shown). The filler cap 175 normally engages ring 176 but can be twisted and removed by first depressing button 177. This releases the associated locking pin. The chamber 171 can be refilled with pulverulent material when the filler cap 175 is removed.

End cap 173 and ring 176 have annular grooves (unnumbered) for receiving terminal edges (unnumbered) of cylindrical wall 172. These edges are preferably glued, ultrasonically bonded or otherwise permanently secured to the end cap 173 and ring 176, to thereby form a unitary assembly comprising cylindrical wall 172, end cap 173, and ring 176. In addition, a plurality of long screws or tie bolts 178 extend from end cap 173 to ring 176 as an aid in securing these members firmly together.

A vertically extending and generally U-shaped transparent safety shield 179 surrounds cylindrical wall 172, except for the portion of wall 172 which is adjacent to chassis or housing 112. This shield is preferably made of polycarbonate. Shield 179 has a generally cylindrical main portion which has indentations to avoid interference with screws 178, and a pair of essentially planar end portions which are affixed (e.g., by bolts) to mounting brackets 117.

Inlet end cap 173 has an opening, preferably off-center, for receiving elbow 150. A second hollow elbow 180, which is inside chamber 171, is connected (e.g. screw threadedly connected) to the first elbow 150. The second elbow 180 has an L-shaped passageway therethrough. This passageway has a first or vertically extending leg which is axially aligned with an outlet passageway leg in elbow 150, and a second transversely (or horizontally) extending leg from which compressed air is discharged into chamber 171. The axis of this second leg (which is horizontal) intersects cylindrical wall 172 at an oblique angle. A vertically extending tubular male fitting 182, which may be threaded into a threaded bore (unnumbered) of twist filler cap 175, provides outlet or discharge means for discharge of a mixture of air and pulverulent material from chamber 171. This fitting 182 is preferably off-center (i.e., not aligned with the central axis of cylinder 172).

The axes of the discharge leg of elbow 180 and the fitting 182 are not aligned. The former is horizontal, the latter is vertical. This non-aligned configuration produces pressurized cyclonic air currents in chamber 171. This promotes efficient and uniform pick-up or entrainment of pulverulent material in the air stream flowing through chamber 171. Formation of cyclonic air currents is aided by directing the air stream from elbow 180 toward the cylindrical wall 172 so that the angle of intersection is an oblique angle rather than a right angle, and by placing the axis of the end fitting 182 off center rather than coincident with the central axis of cylinder 172.

An on-off valve 185 which is opened and closed by means of a manually operable handle 186 controls flow of air and pulverulent material through flexible hose assembly 119. This valve may be conventional. Valve 185 is threaded at one end to connector or fitting 182 and at an opposite end to flexible hose assembly 119.

Hose assembly 119 comprises a flexible hose 188 which has two opposite ends. One end has a fitting 189 for connection to on-off valve 185. The other end has a quick disconnect coupling 190, which may be conventional for connection to a valve stem V of a tire. Valve 185, fitting 189, hose 188, and quick disconnect coupling 190 together provide a flow path for a mixture of pressurized air and pulverulent material from a container 115 to a tire T.

Valves 145 and 185 are open when the respective handles 146 and 186 an in-line, i.e., parallel to the direction of air flow through the respective valves, and closed when the respective handles are perpendicular to the direction of air flow. These handles are shown in intermediate position so as not to obscure the structural elements which form a flow path or passage for air flow.

Container 170 may be made of any convenient size. A specific container 115 may have an inside diameter of 2$^{11}$/$_{16}$ (2.68) inches (6.82 cm) and a length of 7 inches (17.8 cm), giving a volume of 39.7 cubic inches (650 cubic centimeters). This is appreciably smaller than the illustrative volume (113 cubic inches, or about 1850 cc) of container 70 (FIGS. 1–6), but is large enough to hold pulverulent material sufficient for balancing most tires and their associated wheel assemblies. This illustrative volume will contain about 600 grams, or about 21 ounces of pulverulent material, assuming a bulk density of 0.93 gram/cc. The container can be made larger, e.g., up to a volume sufficient to hold 24 ounces (680 grams) of pulverulent material, if desired.

The amount of pulverulent material charged to the either container 70 or container 170 is sufficient to effect dynamic balancing of a tire and an associated wheel assembly but insufficient to fill the tire. Similarly, the volume or capacity of chambers 71 and 171 must be large enough to contain a quantity of pulverulent material sufficient for balancing a tire and associated wheel assembly, but need not be (and preferably is not) large enough to contain sufficient pulverulent material to fill a tire.

The container 170 is filled as follows: First, the apparatus is disconnected from the compressed air supply. Then the chamber 171 of container 170 is depressured by holding the hose 188 away from the user (or operator) and others, and opening valve 185. Then, while the apparatus 110 is vertical, as shown is FIGS. 7 and 8, the user depresses the locking cap button 177, rotates the cap 175 counterclockwise and removes the cap. (If the chamber 171 is still pressurized, air will rush out as the locking button 177 is depressed) The chamber 171 is then filled by pouring polymeric pulverulent material into the open end of the container 115. The filler cap 175 is then reinstalled by depressing the locking button 177, setting the cap 175 in place on bulkhead 176 (an arrow may be provided on the bulkhead 176 to denote alignment of button 177), and rotating clockwise until the pin associated with button 177 locks in place.

Operation of the apparatus 110 is as follows: First, both ball valves 145 and 185 are closed. Then the valve core of the valve V of tire T (FIG. 1) is removed from the valve stem and tire air pressure is bled down to 30% of recommended tire pressure. The quick disconnect assembly 190 of flexible hose 117 is connected to the tire valve stem V. The air intake end of filter 130 of apparatus 110 is then connected to a supply of compressed air. the outlet pressure of the pressure regulator is adjusted (using knob 142) so as not to exceed recommended tire inflation pressure. Next, the ball valve 185 at the hose assembly is opened; then the air supply ball valve 145 is opened. The pulverulent material in chamber 171 will begin to swirl. The user, while holding the pivoting handle 118 with the left hand and the fixed handle 114 at the end of chassis 112 with the right hand, slowly lowers the upper end (hose assembly end) of the apparatus until the pulverulent material clears the chamber 171. Typically, the control axis of the container 115 will be essentially horizontal or even sloping slightly downwardly from the inlet end to the outlet end when the last particles of pulverulent material are evacuated. All of the pulverulent material has been transferred to a tire at this point. Next, the two ball valves 145 and 185 are closed. Air supply ball valve 145 is closed first, then hose assembly ball valve 180 is closed. The hose assembly is disconnected from the tire valve stem and the valve stem core is replaced. The tire T is re-aired or "pumped up" to recommended pressure. A self-sealing tire valve cap may be installed if desired. Finally, the chamber 171 of cylindrical container 115 is depressured by holding the hose assembly quick disconnect coupling 190 away from all persons and opening the ball valve 180 at the hose assembly. The container is now ready for refilling and re-use.

The two illustrative embodiments illustrate two quite different air inlet and outlet configurations for obtaining cyclonic air currents in a chamber 71 or 171 for containing pulverulent material. Other arrangements (e.g., a tangential air inlet) for obtaining cyclonic air currents are known and can be used in the practice of this invention. One arrangement which must be avoided is one in which the air inlet and the air outlet are axially aligned, since this will not result in cyclonic air currents.

The apparatus (10 or 110) of either embodiment provides a single compressed air stream or flow path extending from a source of pressurized air (e.g., compressor 20 in FIG. 1) to a tire valve stem (V in FIG. 1). This flow path comprises an upstream portion on one side of container 70 or 170 and a downstream portion for a mixture of air and pulverulent material on the other side of container 70 or 170. Although preferred embodiments of the invention have been specifically illustrated and described herein, it is to be understood that variations may be made in the apparatus without departing from the spirit and scope of the invention, as defined in the appended claims.

What is claimed is:

1. A method of introducing a pulverulent solid material into a tire through a tire valve stem comprising the steps of:
   (a) confining a predetermined amount of pulverulent polymer is solid material in an upright chamber having opposite first and second ends and having an air inlet at said first end and an air outlet at said second end, said air outlet being higher than said air inlet, said air inlet and said air outlet having non-aligned axes whereby cyclonic air currents are created;
   (b) passing a pressurized air stream successively through said air inlet, said chamber and said air outlet, said pressurized air stream flowing upwardly through said chamber and said air outlet, the pressurized air creating cyclonic air currents within the chamber and thereby creating an essentially uniform admixture of said pulverulent material and air; and
   (c) introducing the resulting admixture of said pulverulent material and air into a tire through an associated tire valve stem under the influence of the pressurized cyclonic air currents, the amount of pulverulent material so introduced into the tire being sufficient to effect dynamic balancing of said tire and a wheel assembly associated therewith but insufficient to substantially fill said tire.

2. The method defined in claim 1 wherein the amount of pulverulent material introduced into the tire is from about 3 ounces to about 24 ounces.

3. The method defined in claim 1, wherein said pulverulent material is dry and freely flowable.

4. The method defined in claim 1 wherein substantially all air introduced into said tire in said admixture of air and pulverulent material is retained in said tire during introduction of said admixture.

5. The method defined in claim 1 wherein the pressurized air stream passed through said air inlet and said chamber is the only air stream introduced into said tire.

6. The method defined in claim 1, wherein said pressurized air stream is filtered to remove moisture prior to passing through said chamber.

7. The method defined in claim 1 wherein said chamber is defined by an essentially rigid cylindrical wall.

8. The method defined in claim 1 wherein said pressurized air stream is pressurized to a pressure sufficient to inflate a tire but not over about 125 pounds per square inch.

9. The method defined in claim 8 wherein said pressurized air stream is pressurized to a pressure from about 40 to about 125 pounds per square inch.

10. The method defined in claim 1, including the step of
    (d) selectively and adjustably regulating the pressurization of the air currents.

11. The method defined in claim 1 wherein said pressurized air stream is passed through a pressure regulator before passing through said air inlet.

12. An apparatus for introducing a pulverulent material into a tire through a tire valve stem comprising:
    (a) an essentially rigid and essentially cylindrical container defining a chamber for confining a predetermined amount of pulverulent material, said chamber having an essentially vertical axis and opposite first and second ends, an air inlet at said first end and an air outlet at said second end, said air outlet being higher than said air inlet whereby compressed air flows upwardly through said chamber, said air inlet and said air outlet being axially remote and non-aligned whereby the confined pulverulent material is subjected to pressurized cyclonic air currents when pressurized air is introduced through said air inlet,
    (b) means for establishing a flow path for pressurized air extending from an intake for pressurized air to said air inlet of said chamber, said flow path having a pressure regulator therein, and
    (c) means for introducing an admixture of pressurized air and said pulverulent material into a tire through an associated tire valve stem under the influence of the pressurized cyclonic air currents,
    the volume of said chamber being sufficient to contain an amount of pulverulent material sufficient to effect dynamic balancing of said tire and an associated wheel assembly but insufficient to fill said tire.

13. The apparatus defined in claim 12, wherein,
    said means for introducing an admixture of pressurized air and pulverulent material comprises a flexible hose having at a discharge end a coupling for a connection to said tire valve stem.

14. The apparatus defined in claim 12, further including a first on-off valve for controlling the flow of pressurized air from said pressure regulator to said chamber and a second on-off valve for controlling the flow of said admixture of pressurized air and pulverulent material from said chamber.

15. The apparatus defined in claim 12, wherein,
    the volume of said chamber is such as to contain from about 3 ounces to about 24 ounces of said pulverulent material.

16. The apparatus defined in claim 12, said apparatus providing a single air stream extending from said source of pressurized air to said tire valve stem.

17. The apparatus defined in claim 12, said apparatus further including a filter for removing moisture upstream of said chamber.

18. The apparatus defined in claim 12, further including (e) a flexible hose for delivering a mixture of air and pulverulent material from said cylindrical chamber to a tire; and (f) a manually operated on/off valve for controlling the discharge of said mixture of air and pulverulent material into said flexible hose.

19. A portable apparatus for introducing a pulverulent material into a tire through a tire valve system comprising:

(a) an upright chassis having therein a means for forming a flow path for compressed air, said chassis having therein an air intake adapted to be connected to a source of pressurized air, and a pressure regulator;

(b) an upright rigid cylindrical container defining a chamber for containing pulverulent material said container having first and second ends, said second end being above said first end, said container further including an air inlet at said first end and outlet for a mixture of air and pulverulent material at said second end, wherein said inlet and said outlet have non-aligned axes whereby compressed air flows upwardly through said chamber and cyclonic currents are created within said chamber by pressurized air flow therethrough; and (c) means for conveying an admixture of pressurized air and said pulverulent material from said chamber and for introducing said admixture into a tire through an associated tire valve stem under the influence of pressurized cyclonic air currents, the volume of said air chamber being sufficient to contain an amount of pulverulent material sufficient to effect dynamic balancing of said tire and an associated wheel assembly but insufficient to fill said tire; and (d) means for securing said chassis and said container together to form a portable unitary assembly.

20. Apparatus as defined in claim 19, wherein, said means for conveying said admixture of air and pulverulent material and for introducing said admixture into a tire valve stem comprises a flexible hose having a discharge end and a coupling for connection to said tire valve stem at said discharge end.

21. Apparatus as defined in claim 20, wherein, said coupling at said discharge end is a quick disconnect coupling.

22. Apparatus as defined in claim 20, wherein, said chamber has a single air inlet and a single air outlet, and said apparatus has means for establishing a single flow path for said compressed air, said single flow path extending from said air intake to said discharge end and extending through said pressure regulator and upwardly through said chamber from said air inlet to said air outlet.

23. Apparatus as defined in claim 19, further including a first on-off valve for regulating the flow of compressed air into said chamber and a second on-off valve for controlling the discharge of said admixture of air of pulverulent material from said chamber.

24. Apparatus as defined in claim 19, wherein, said second end of said air chamber has a removable filler cap to permit filling of said chamber with pulverulent material when said cap is removed, said filler cap receiving a tubular fitting which forms said air outlet.

* * * * *

UNITED STATES PATENT AND TRADEMARK OFFICE
CERTIFICATE OF CORRECTION

PATENT NO. : 5,472,023

DATED : December 5, 1995

INVENTOR(S) : Fogal, Sr. et al.

It is certified that error appears in the above-indentified patent and that said Letters Patent is hereby corrected as shown below:

On the title page: Item [54] and Column 1, line 2, replace "POLVERULENT" with –PULVERULENT–.

Col. 1, line 2 replace "POLVERULENT" with –PULVERULENT–.

Col. 11, line 36 delete the word "is" as superfluous.

Signed and Sealed this

Thirtieth Day of April, 1996

Attest:

BRUCE LEHMAN

Attesting Officer     Commissioner of Patents and Trademarks